United States Patent
Kim et al.

(10) Patent No.: US 9,917,316 B2
(45) Date of Patent: Mar. 13, 2018

(54) APPARATUS AND METHOD FOR CONTROLLING HUMIDIFICATION AMOUNT OF MEMBRANE HUMIDIFIER FOR FUEL CELL

(71) Applicant: Hyundai Motor Company, Seoul (KR)

(72) Inventors: Hyun Yoo Kim, Seoul (KR); Jeong Hee Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 118 days.

(21) Appl. No.: 14/953,835

(22) Filed: Nov. 30, 2015

(65) Prior Publication Data

US 2017/0077530 A1    Mar. 16, 2017

(30) Foreign Application Priority Data

Sep. 10, 2015 (KR) .................. 10-2015-0128183

(51) Int. Cl.
| | | |
|---|---|---|
| *H01M 8/04* | (2016.01) | |
| *H01M 8/04828* | (2016.01) | |
| *H01M 8/04119* | (2016.01) | |
| *B01D 53/00* | (2006.01) | |

(52) U.S. Cl.
CPC ..... *H01M 8/0485* (2013.01); *H01M 8/04141* (2013.01); *H01M 8/04149* (2013.01); *H01M 8/04835* (2013.01); *B01D 53/00* (2013.01)

(58) Field of Classification Search
CPC ........... H01M 8/0485; H01M 8/04141; H01M 8/04835; H01M 8/04149; H01M 8/04507; H01M 8/04522; H01M 8/04828; H01M 8/35

See application file for complete search history.

(56) References Cited

FOREIGN PATENT DOCUMENTS

| JP | 2001-332280 A | 11/2001 | |
|---|---|---|---|
| JP | 2005-038823 A | 2/2005 | |
| JP | 2006-164781 A | 6/2006 | |
| JP | 2008-243755 A | 10/2008 | |
| JP | 2013-258111 A | 12/2013 | |
| JP | 2013258111 A * | 12/2013 | ............. H01M 8/04 |
| KR | 10-2004-0101100 | 9/2006 | |

* cited by examiner

*Primary Examiner* — Carlos Barcena
(74) *Attorney, Agent, or Firm* — Mintz Levin Cohn Ferris Glovsky and Popeo, P.C.; Peter F. Corless

(57) ABSTRACT

An apparatus and a method for controlling a humidification amount of a membrane humidifier for a fuel cell are provided. The humidification amount of the membrane humidifier relative to air supplied to a stack is changed by adjusting a difference in partial pressure of moisture between the inside and the exterior of a hollow fiber membrane that constitutes the membrane humidifier for a fuel cell.

8 Claims, 4 Drawing Sheets

② - ① = DIFFERENCE IN PARTIAL PRESSURE OF MOISTURE

⟶ : HUMID AIR PERMEATES INTO HOLLOW FIBER MEMBRANE

APPARATUS AND METHOD FOR CONTROLLING HUMIDIFICATION AMOUNT OF MEMBRANE HUMIDIFIER FOR FUEL CELL

CROSS-REFERENCE TO RELATED APPLICATION

This application claims under 35 U.S.C. § 119a the benefit of Korean Patent Application No. 10-2015-0128183 filed on Sep. 10, 2015, the entire contents of which are incorporated herein by reference.

BACKGROUND (a) Technical Field

The present invention relates to an apparatus and a method for controlling a humidification amount of a membrane humidifier for a fuel cell. More particularly, the present invention relates to an apparatus and a method for controlling a humidification amount of a membrane humidifier for a fuel cell, capable of controlling the humidification amount of the membrane humidifier relative to air supplied to a stack by adjusting a difference in partial pressure of moisture between the inside and the exterior of a hollow fiber membrane that constitutes the membrane humidifier.

(b) Background Art

In general, humidification of an electrolyte membrane in a fuel cell is required to operate a fuel cell system, and for this purpose, a humidifying apparatus is used which is operated in a manner in which humid gas discharged from the fuel cell exchanges moisture with dry gas supplied from outside gas.

Examples of the humidifying apparatus for the fuel cell include ultrasonic humidifiers, steam humidifiers, evaporative humidifiers, and the like, and as a humidifying apparatus used for the fuel cell, a membrane humidifier, which uses a hollow fiber membrane, is properly used. In particular, a configuration and an operation of a membrane humidifier for a fuel cell in the related art will be described below. The attached FIG. 1 illustrates an air supply system of a fuel cell system according to the related art, and FIG. 2 illustrates a membrane humidifier structure included in the air supply system in the related art.

The fuel cell system includes a fuel supply system configured to supply fuel (e.g., hydrogen) to a fuel cell stack, an air supply system configured to supply oxygen, which is an oxidizing agent required for an electrochemical reaction and contained in air, to the fuel cell stack, a heat and water management system configured to adjust an operating temperature of the fuel cell stack, and the fuel cell stack (hereinafter, referred to as a stack) configured to generate electrical energy using hydrogen and air.

Therefore, when hydrogen is supplied from the fuel supply system to a fuel electrode of the stack, and at the same time, oxygen is supplied from the air supply system to an air electrode of the fuel cell stack, an oxidation reaction of hydrogen is performed at the fuel electrode such that hydrogen ions (proton) and electrons are produced, and the produced hydrogen ions and electrons are moved to the air electrode via an electrolyte membrane and a separating plate, respectively, and water is produced at the air electrode through an electrochemical reaction among oxygen contained in air, the hydrogen ions and the electrons, which have been moved from the fuel electrode, and at the same time, electrical energy is generated from a flow of the electrons.

As illustrated in FIG. 1, the air supply system includes a membrane humidifier 100 and an air compressor 202 to supply humidified air (e.g., oxygen) to a stack 200. Therefore, exterior dry air is supplied into the hollow fiber membrane of the membrane humidifier 100 by a suction operation of the air compressor 202, and at the same time, discharge gas (e.g., humid air), which is discharged from the fuel cell stack 200 after the reaction, passes through the membrane humidifier 100, and in this case, moisture contained in the discharge gas permeates into the hollow fiber membrane to humidify dry air.

Referring to the attached FIG. 2, the membrane humidifier 100 in the related art includes a housing 101 having a supply port 102 formed at one end of the housing 101 and into which dry air flows from an air compressor, and a discharge port 103 formed at the other end of the housing 101 and from which humidified air is discharged.

A bundle of hollow fiber membranes, in which a plurality of hollow fiber membranes 106 are concentrated, are accommodated in the housing 101, and both ends of the bundle of hollow fiber membranes are accommodated by being potted (e.g., fixed) by typical potting members 108. An inlet 104 into which humid air discharged from the stack flows is formed in one circumferential portion of the housing 101, and an outlet 105 from which humid air from which moisture has been removed is discharged is formed in the other circumferential portion.

Therefore, when the discharge gas, which has been discharged from the stack after the reaction is completed, that is, the humid air is supplied from the inlet 104 of the housing 101 to the hollow fiber membranes 106, moisture is separated from the humid air by a capillary action in the respective hollow fiber membranes 106, and the separated moisture is condensed while passing through capillary tubes in the hollow fiber membranes 106, and then moved into the hollow fiber membranes 106. Further, the humid air from which moisture has been separated is moved along the exterior of the hollow fiber membranes 106, and then discharged through the outlet 105 of the housing 101.

Simultaneously, exterior gas (e.g., dry air) is supplied through the supply port 102 of the housing 101 by the operation of the air compressor, the dry air, which is supplied through the supply port 102, is moved through the hollow fiber membranes 106, and in this case, since the moisture separated from the humid air has been already moved into the hollow fiber membranes 106, the dry air is humidified by the moisture, and the humidified dry air is supplied to the air electrode of the stack through the discharge port 103.

Meanwhile, a humidification principle of the membrane humidifier will be described in more detail below with reference to the attached FIG. 3. When the humid air, which has been discharged from the stack after the reaction is completed, is supplied to an outer periphery of the hollow fiber membranes 106, and at the same time, dry air (e.g., exterior gas) supplied from the air compressor flows inside the hollow fiber membranes 106, water contained in the humid air humidifies the dry air in the hollow fiber membranes 106 while passing through the hollow fiber membranes 106, and the principle, that moisture in the humid air passes through the hollow fiber membranes 106, is achieved by transferring the moisture using, as a motive force, a difference in partial pressure of a fluid (moisture) between the inside and the exterior (indicated by ① and ② in FIG. 3) of the hollow fiber membranes 106.

Various methods are being researched to optimize performance in transferring moisture through the hollow fiber membrane of the membrane humidifier for the fuel cell. The above information disclosed in this section is merely for enhancement of understanding the background of the invention and therefore it may contain information that does not form the prior art that is already known in this country to a person of ordinary skill in the art.

SUMMARY

The present invention has been made in an effort to solve the above-described problems associated with related art, to maximize performance in transferring moisture through a hollow fiber membrane of a membrane humidifier. In particular, the present invention provides an apparatus and a method for controlling a humidification amount of a membrane humidifier for a fuel cell, capable of optimally adjusting the humidification amount of the membrane humidifier relative to air supplied to a stack by adjusting a difference in partial pressure of moisture between the inside and the exterior of the hollow fiber membrane based on a humidity degree of a polymer electrolyte membrane in the stack.

In one aspect, the present invention provides an apparatus for controlling a humidification amount of a membrane humidifier for a fuel cell, the apparatus may include: an air compressor configured to compress air and supply the air to the membrane humidifier; and a membrane humidifier configured to humidify the air supplied from the air compressor and supply the air to a stack, in which a pressure control valve may be mounted at an outlet of the membrane humidifier to adjust pressure of humid air that flows from the stack to the exterior of a hollow fiber membrane of the membrane humidifier, and a first air shut-off valve may be mounted at an inlet of the stack to adjust pressure of air that flows from the air compressor to the inside of the hollow fiber membrane of the membrane humidifier.

In an exemplary embodiment, a second air shut-off valve may be further mounted in a humid air discharge line connected from an outlet of the stack to an inlet of the membrane humidifier. The apparatus may further include a humidity sensor configured to measure humidity of the stack to determine opening degrees of the pressure control valve and the air shut-off valves.

In another aspect, the present invention provides a method of controlling a humidification amount of a membrane humidifier for a fuel cell, the method may include: measuring humidity of a stack; increasing pressure in a hollow fiber membrane of the membrane humidifier by reducing or blocking the amount of humid air supplied from the stack to the membrane humidifier when the measured humidity is equal to or greater than a reference value; and increasing pressure both inside and outside the hollow fiber membrane of the membrane humidifier by blocking an outlet of the membrane humidifier through which humid air is supplied from the stack to the membrane humidifier and simultaneously the humid air may be discharged when the measured humidity is equal to or less than the reference value.

In addition, the increasing of the pressure in the hollow fiber membrane may include decreasing an opening degree of a first air shut-off valve mounted at an inlet of the stack or closing the first air shut-off valve, or decreasing an opening degree of a second air shut-off valve mounted in a humid air discharge line that connects an outlet of the stack and an inlet of the membrane humidifier or closing the second air shut-off valve. When pressure inside the hollow fiber membrane of the membrane humidifier is increased, a difference in partial pressure of moisture between the inside and the outside of the hollow fiber membrane may be decreased, thus decreasing a humidification amount of dry air flowing inside the hollow fiber membrane.

Further, the increasing of the pressure both inside and outside the hollow fiber membrane may include decreasing an opening degree of a pressure control valve mounted at an outlet of the membrane humidifier or closing the pressure control valve when humid air is supplied from the stack to the membrane humidifier. When the pressure both inside and outside the hollow fiber membrane of the membrane humidifier is increased, a difference in partial pressure of moisture between the inside and the outside of the hollow fiber membrane may be increased, thus increasing a humidification amount of dry air flowing inside the hollow fiber membrane.

Through the aforementioned technical solutions, the present invention provides the effects below.

First, when humidity of the polymer electrolyte membrane in the stack is equal to or less than a reference value such that the polymer electrolyte membrane is dry, it may be possible to increase the humidification amount of the membrane humidifier relative to air supplied to the stack by increasing the difference in partial pressure of moisture between the inside and the outside of the hollow fiber membrane.

Second, when humidity of the polymer electrolyte membrane in the stack is equal to or greater than the reference value such that the polymer electrolyte membrane is humid, it may be possible to decrease the humidification amount of the membrane humidifier relative to air supplied to the stack by decreasing the difference in partial pressure of moisture between the inside and the outside of the hollow fiber membrane.

As described above, it may be possible to more optimally adjust the humidification amount of the membrane humidifier relative to air supplied to the stack by adjusting the difference in partial pressure of moisture between the inside and the outside of the hollow fiber membrane depending based a humidification degree of the polymer electrolyte membrane in the stack.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
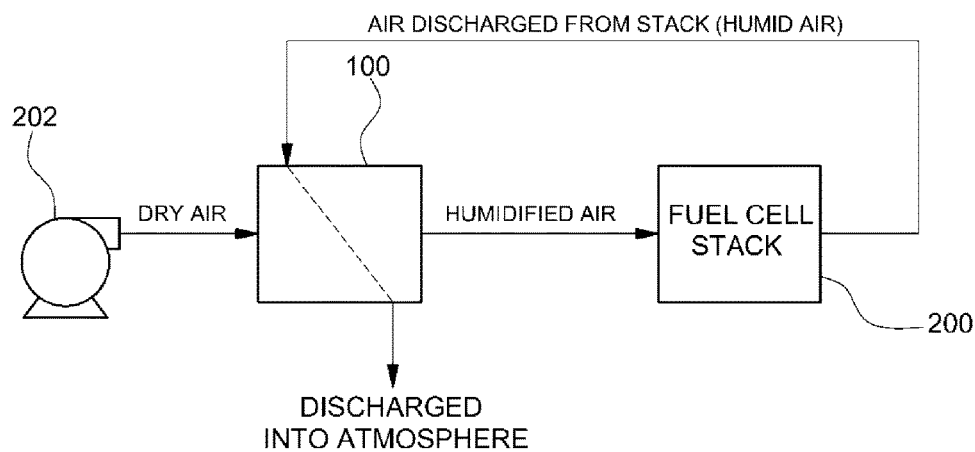
FIG. 1 is a diagram illustrating an air supply system of a fuel cell system according to the related art.
Figure 2:
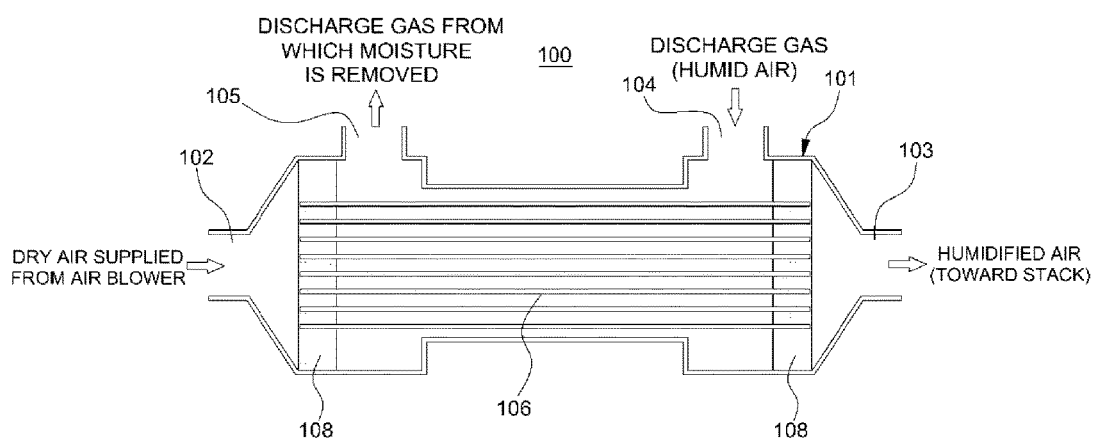
FIG. 2 is a cross-sectional view illustrating a structure of a membrane humidifier for a fuel cell in the related art.

Reference numerals set forth in the Drawings include reference to the following elements as further discussed below:

- 100: membrane humidifier
- 101: housing
- 102: supply port
- 103: discharge port
- 104: inlet
- 105: outlet
- 106: hollow fiber membrane
- 108: potting member
- 110: first air shut-off valve
- 120: second air shut-off valve
- 130: pressure control valve
- 140: humid air discharge line
- 200: stack
- 202: air compressor It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 4:
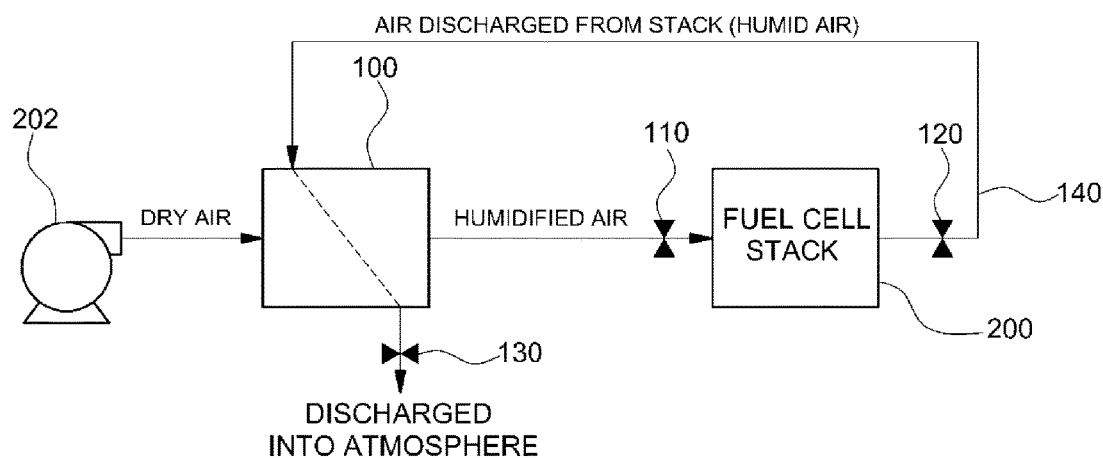
FIG. 4 is a diagram illustrating an apparatus for controlling a humidification amount of a membrane humidifier for a fuel cell according to an exemplary embodiment of the present invention.

Hereinafter, an exemplary embodiment of the present invention will be described in detail with reference to the accompanying drawings. The attached FIG. 4 is a configuration diagram illustrating an apparatus for controlling a humidification amount of a membrane humidifier for a fuel cell according to an exemplary embodiment of the present invention. As illustrated in FIG. 4, an air supply system for a fuel cell may include a membrane humidifier 100 and an air compressor 202 configured to supply humidified air (e.g., oxygen) to a stack 200.

In particular, exterior dry air may be supplied into the hollow fiber membrane of the membrane humidifier 100 by a suction operation of the air compressor 202, and simultaneously, discharge gas (e.g., humid air), discharged from the stack 200 after the reaction, may pass through the membrane humidifier 100 and moisture contained in the discharge gas may permeate into the hollow fiber membrane to humidify the dry air.

A pressure control valve 130 may be mounted at an outlet 105 of the membrane humidifier 100 and may be operated by a controller. In particular, the outlet 105 of the membrane humidifier 100 is an outlet through which humid air may be discharged after dry air in the hollow fiber membrane is humidified, and the pressure control valve 130 may be mounted at the outlet. The pressure control valve 130 may be configured to adjust pressure of the humid air in the membrane humidifier 100, that is, pressure of the humid air that flows from the stack to the exterior of the hollow fiber membrane of the membrane humidifier 100.

Therefore, when the pressure control valve 130 is closed, the humid air may be discharged through the outlet 105, and as a result, pressure of the humid air in the membrane humidifier 100 may increase. Further, when the pressure control valve 130 is opened, pressure of the humid air in the membrane humidifier 100 may decrease. In addition, a first air shut-off valve 110 may be mounted at an inlet of the stack 200, and a second air shut-off valve 120 may be mounted in a humid air discharge line 140 connected from an outlet of the stack 200 to an inlet 104 of the membrane humidifier 100.

The first and second air shut-off valves 110 and 120 may be operated by the controller and configured to adjust pressure of air that flows from the air compressor 202 into the hollow fiber membrane of the membrane humidifier 100. Therefore, when the first air shut-off valve 110 is closed, air (e.g., humidified air) flowing from the inside of the hollow fiber membrane of the membrane humidifier 100 to the stack 200 may be blocked, causing the pressure of dry air flowing inside the hollow fiber membrane to increase.

When the second air shut-off valve 110 is closed, air (e.g., humid air), discharged from the stack 200 after the reaction, is not supplied to the membrane humidifier 100, and as a result, a flow of air (e.g., humidified dry air), supplied to the stack 200 through the interior of the hollow fiber membrane of the membrane humidifier 100, may also be delayed, causing the pressure of air flowing inside the hollow fiber membrane to increase.

Meanwhile, a humidity sensor (not illustrated), configured to measure humidity of the electrolyte membrane in the stack, may be mounted in the stack 200, and opening degrees of the pressure control valve 130 and the first and second air shut-off valves 110 and 120 may be determined based on a value of humidity measured by the humidity sensor. In particular, a method of controlling the humidification amount of the membrane humidifier for a fuel cell based on the above-described configurations will be described below.

Figure 5:
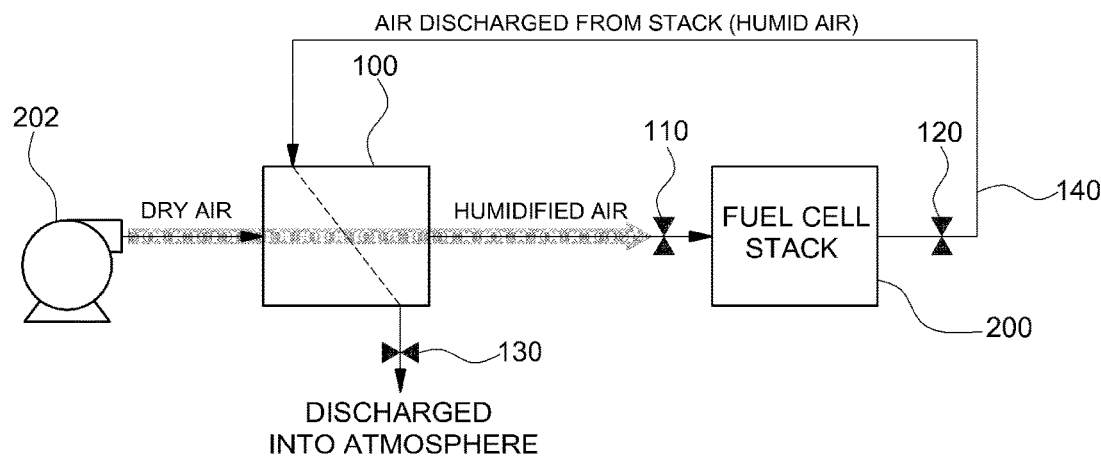
FIGS. 5 to 7 are diagrams illustrating an operation flow of the apparatus for controlling the humidification amount of the membrane humidifier for a fuel cell according to an exemplary embodiment of the present invention.
Figure 6:
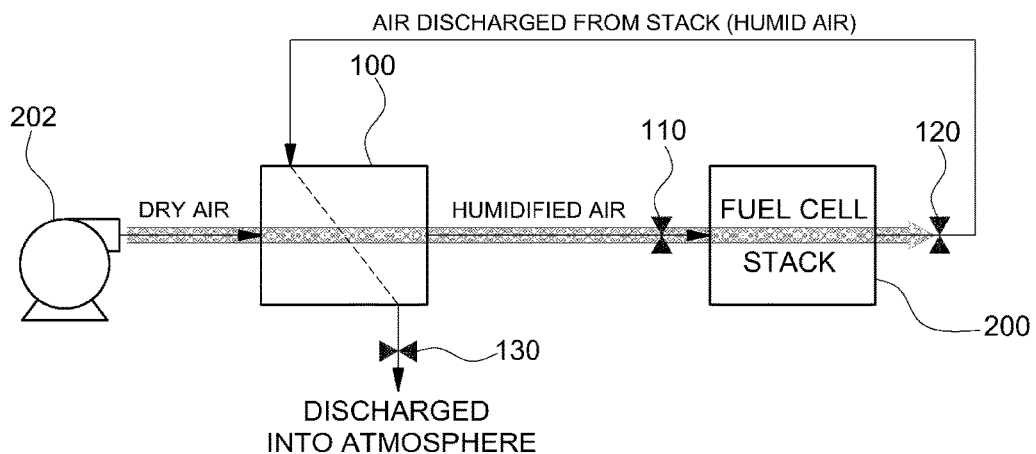
Figure 7:
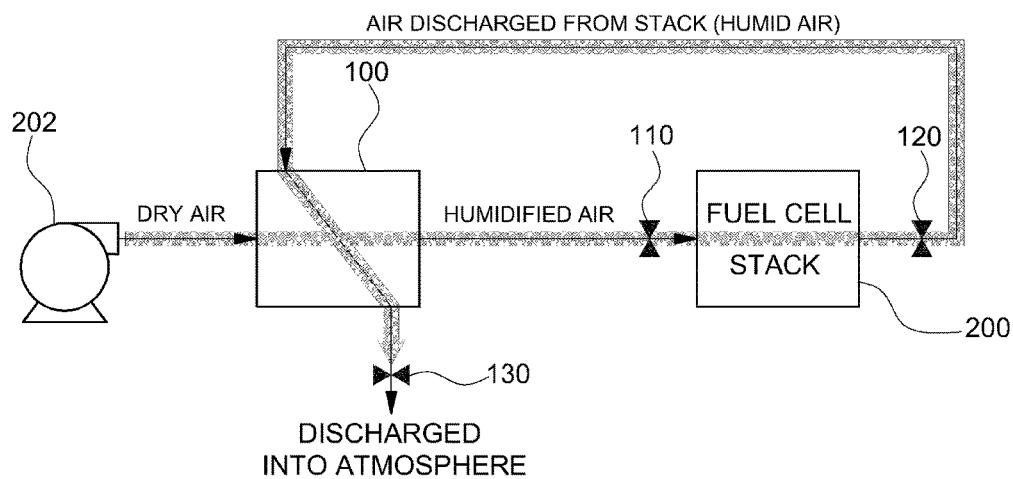
Figure 8:
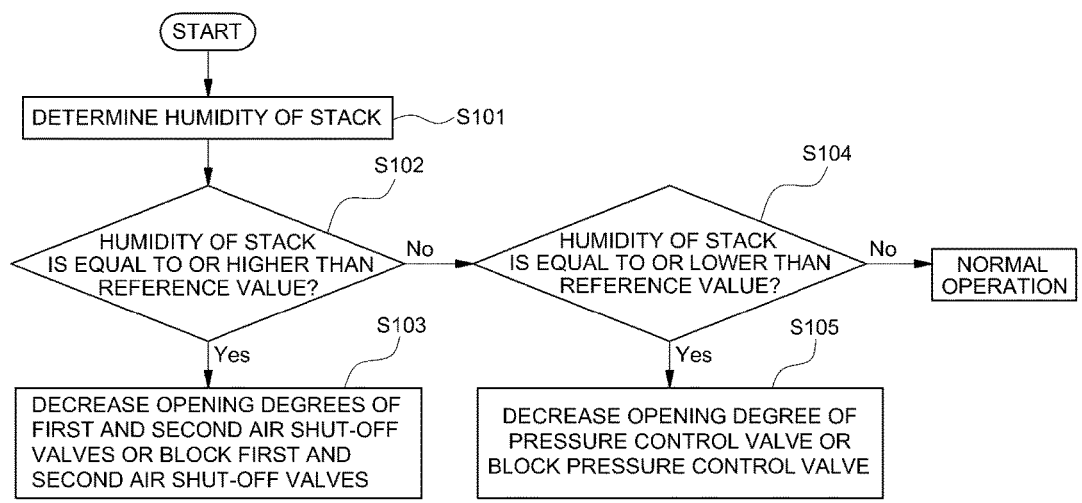
FIG. 8 is a flowchart illustrating a method of controlling the humidification amount of the membrane humidifier for a fuel cell according to an exemplary embodiment of the present invention.

The attached FIGS. 5 to 7 are configuration diagrams illustrating an operation flow of the apparatus for controlling the humidification amount of the membrane humidifier for a fuel cell according to the present invention, and FIG. 8 is a flowchart illustrating a method of controlling the humidification amount of the membrane humidifier for a fuel cell according to the present invention.

First, humidity of the stack may be measured by the humidity sensor (S101). In particular, humidity of the stack may include measuring a humid state of the polymer electrolyte membrane that is an element of the stack. When the measured humidity is equal to or greater than a reference value, the polymer electrolyte membrane in the stack may be determined to be humid (S102), and as a result, the opening degree of the first air shut-off valve 110 mounted at the inlet of the stack 200 may be temporarily decreased or the first air shut-off valve 110 may be closed (S103).

Particularly, when the opening degree of the first air shut-off valve 110 is temporarily decreased or the first air shut-off valve 110 is closed, the amount of air, supplied from the air compressor 202 to the stack 200 via the membrane humidifier 100, may be decreased or the air supply may be blocked. When the first air shut-off valve 110 is closed, the air, supplied from the air compressor 202 to the stack 200 via the interior of the hollow fiber membrane of the membrane humidifier 100, may be blocked at the inlet of the stack as indicated by a bold solid line in the attached FIG. 5, and as a result, pressure of the air, which flows inside the hollow fiber membrane of the membrane humidifier 100, may increase.

Figure 3:
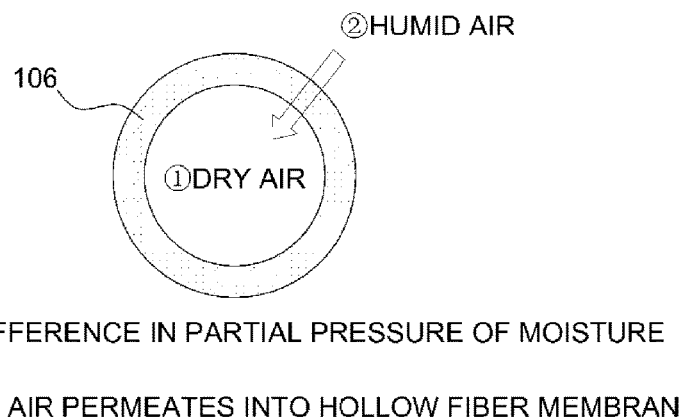
FIG. 3 is a view illustrating a hollow fiber membrane humidification principle of the membrane humidifier according to the related art.

As described above, when the opening degree of the first air shut-off valve 110 is decreased or the first air shut-off valve 110 is closed, and thus only pressure in the hollow fiber membrane of the membrane humidifier (e.g., pressure of dry air in the hollow fiber membrane indicated by ① in FIG. 3) may increase, a difference in partial pressure of moisture between the inside and the outside of the hollow fiber membrane 106 may decrease, causing the humid air supplied to the exterior of the hollow fiber membrane 106 to not smoothly permeate into the hollow fiber membrane 106, and as a result, the humidification amount of the membrane humidifier relative to dry air in the hollow fiber membrane may be reduced.

When the humidification amount of the membrane humidifier relative to the dry air in the hollow fiber membrane is reduced as described above, dry air with lowered humidity may be supplied to the stack from the membrane humidifier, and as a result, humidity of the stack (e.g., a humid state of the polymer electrolyte membrane) may decrease. Optionally, when the humidity measured as described above is equal to or greater than the reference value, the polymer electrolyte membrane in the stack may be determined to be humid (S102), and as a result, the opening degree of the second air shut-off valve 120 mounted at the outlet of the stack 200 may be temporarily decreased or the second air shut-off valve 120 may be closed (S103) when the first air shut-off valve 110 mounted at the inlet of the stack 200 remains open.

In other words, the opening degree of the second air shut-off valve 120 mounted in the humid air discharge line 140 that connects the outlet of the stack 200 and the inlet of the membrane humidifier 100 may be temporarily decreased or the second air shut-off valve 120 may be closed. Even though the opening degree of the second air shut-off valve 120 decreases or the second air shut-off valve 120 is closed, air (e.g., humid air), discharged from the stack 200 after the reaction, may be blocked from being supplied to the membrane humidifier 100 as indicated by a bold solid line in the attached FIG. 6, and as a result, a flow of air (e.g., humidified dry air), supplied to the stack 200 through the interior of the hollow fiber membrane of the membrane humidifier 100, may also be delayed, thus causing the pressure of air flowing inside the hollow fiber membrane to increase.

Similarly, when the opening degree of the second air shut-off valve 120 is decreased or the second air shut-off valve 120 is closed, and thus pressure in the hollow fiber membrane of the membrane humidifier (e.g., pressure of dry air in the hollow fiber membrane indicated by ① in FIG. 3) increases, a difference in partial pressure of moisture between the inside and the outside of the hollow fiber membrane 106 may decrease, such that the humid air supplied to the exterior of the hollow fiber membrane 106 does not smoothly permeate into the hollow fiber membrane 106, and as a result, the humidification amount of the membrane humidifier relative to dry air in the hollow fiber membrane may be reduced.

When the humidification amount of the membrane humidifier relative to the dry air in the hollow fiber membrane is reduced as described above, dry air with lowered humidity may be supplied to the stack from the membrane humidifier, and as a result, humidity of the stack (e.g., a humid state of the polymer electrolyte membrane) may decrease. Meanwhile, when humidity measured as described above is equal to or less than the reference value, the polymer electrolyte membrane in the stack may be determined to be dry (S104), and as a result, the opening degree of the membrane humidifier may be temporarily decreased or the membrane humidifier may be closed (S105) when the first and second air shut-off valves 110 and 120 remain open.

In other words, when the measured humidity is equal to or less than the reference value, when the first and second air shut-off valves 110 and 120 are opened, the humid air may be supplied to the membrane humidifier 100 from the stack 200, and at the same time, the opening degree of the pressure control valve 130 mounted at the outlet 105 of the membrane humidifier 100 may be temporarily decreased or the pressure control valve 130 may be closed. Therefore, since the outlet 105 of the membrane humidifier 100, through which the humid air is discharged, is blocked, pressure exterior to the hollow fiber membrane as well as pressure in the hollow fiber membrane of the membrane humidifier 100 may be increased.

When the opening degree of the pressure control valve 130 is decreased or the pressure control valve 130 is closed, air (e.g., humid air), discharged from stack 200 after the reaction, may be supplied more smoothly to the exterior of the hollow fiber membrane of the membrane humidifier 100, and then may not be discharged to the outlet 105 after humidification is completed as indicated by a bold solid line in the attached FIG. 7, and as a result, pressure exterior to the hollow fiber membrane may increase.

As described above, when the opening degree of the pressure control valve 130 is decreased or the pressure control valve 130 is closed, and thus pressure exterior to the hollow fiber membrane of the membrane humidifier (e.g., pressure of the humid air outside the hollow fiber membrane indicated by ② in FIG. 3) increases, a difference in partial pressure of moisture between the inside and the exterior of the hollow fiber membrane 106 may increase, and thus, the humid air supplied to the outside of the hollow fiber membrane 106 may permeate more smoothly into the hollow fiber membrane 106, and as a result, the humidification amount of the membrane humidifier relative to dry air in the hollow fiber membrane may increase.

When the humidification amount of the membrane humidifier relative to the dry air in the hollow fiber membrane is increased as described above, dry air with increased humidity may be supplied to the stack from the membrane humidifier, and as a result, humidity of the stack (e.g., a humid state of the polymer electrolyte membrane) may increase. As described above, it may be possible to optimally adjust the humidification amount of the membrane humidifier relative to air supplied to the stack by adjusting the difference in partial pressure of moisture between the inside and the outside of the hollow fiber membrane based on a humidity degree of the polymer electrolyte membrane in the stack.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An apparatus for controlling a humidification amount of a membrane humidifier for a fuel cell, comprising:
   an air compressor configured to compress air and supply the air to the membrane humidifier;
   a membrane humidifier configured to humidify the air supplied from the air compressor and supply the air to a stack;
   a pressure control valve mounted at an outlet of the membrane humidifier to adjust pressure of humid air that flows from the stack to an exterior of a hollow fiber membrane of the membrane humidifier;
   a first air shut-off valve mounted at an inlet of the stack to adjust pressure of air that flows from the air compressor to the inside of the hollow fiber membrane of the membrane humidifier;
   a humidity sensor configured to measure humidity of the stack; and
   a controller configured to:
      increase pressure in the hollow fiber membrane of the membrane humidifier by reducing or blocking an amount of humid air supplied from the stack to the membrane humidifier when the measured humidity is equal to or greater than a reference value; and
      increase pressure inside and outside the hollow fiber membrane of the membrane humidifier by blocking the outlet of the membrane humidifier through which humid air is supplied from the stack to the membrane humidifier and humid air is discharged when the measured humidity is equal to or less than the reference value.

2. The apparatus of claim 1, wherein a second air shut-off valve is further mounted in a humid air discharge line connected from an outlet of the stack to an inlet of the membrane humidifier.

3. The apparatus of claim 1, wherein the humidity sensor is configured to measure humidity of the stack to determine opening degrees of the pressure control valve and the air shut-off valves.

4. A method of controlling a humidification amount of a membrane humidifier for a fuel cell, comprising:
   measuring, by a humidity sensor, humidity of a stack;
   increasing, by a controller, pressure in a hollow fiber membrane of the membrane humidifier configured to humidify air supplied from an air compressor and supply the air to a stack, by reducing or blocking an amount of humid air supplied from the stack to the membrane humidifier when the measured humidity is equal to or greater than a reference value, wherein the membrane humidifier receives air compressed and supplied from the air compressor; and
   increasing, by the controller, pressure inside and outside the hollow fiber membrane of the membrane humidifier by blocking an outlet of the membrane humidifier through which humid air is supplied from the stack to the membrane humidifier and humid air is discharged when the measured humidity is equal to or less than the reference value,
   wherein a pressure control valve is mounted at the outlet of the membrane humidifier to adjust the pressure of the humid air that flows from the stack to an exterior of the hollow fiber membrane and a first air shut-off valve is mounted at an inlet of the stack to adjust the pressure of the air that flows from the air compressor to the inside of the hollow fiber membrane.

5. The method of claim 4, further comprising:
   decreasing, by the controller, an opening degree of a first air shut-off valve mounted at an inlet of the stack or closing the first air shut-off valve, or decreasing, by the controller, an opening degree of a second air shut-off valve mounted in a humid air discharge line that connects an outlet of the stack and an inlet of the membrane humidifier or closing the second air shut-off valve.

6. The method of claim 4, wherein when pressure inside the hollow fiber membrane of the membrane humidifier is increased, a difference in partial pressure of moisture between the inside and an exterior of the hollow fiber membrane is decreased, causing a humidification amount of dry air flowing inside the hollow fiber membrane to decrease.

7. The method of claim 4, further comprising:
   decreasing, by the controller, an opening degree of a pressure control valve mounted at an outlet of the membrane humidifier or closing the pressure control valve when humid air is supplied from the stack to the membrane humidifier.

8. The method of claim 4, wherein when pressure inside and outside the hollow fiber membrane of the membrane humidifier is increased, a difference in partial pressure of moisture between the inside and an exterior of the hollow fiber membrane is increased, causing a humidification amount of dry air flowing inside the hollow fiber membrane to increase.

* * * * *